United States Patent [19]

Matsumoto

[11] Patent Number: 5,469,502
[45] Date of Patent: Nov. 21, 1995

[54] TELECOMMUNICATION SYSTEM FOR SELECTING OPTIMUM TRANSFER RATE

[75] Inventor: Takashi Matsumoto, Kawasaki, Japan

[73] Assignee: Fujitsu Limited, Kanagawa, Japan

[21] Appl. No.: 343,209

[22] Filed: Nov. 22, 1994

Related U.S. Application Data

[63] Continuation of Ser. No. 883,786, May 15, 1992, abandoned.

[30] Foreign Application Priority Data

May 16, 1991 [JP] Japan ................................. 3-111709

[51] Int. Cl.⁶ .................. H04M 7/00; H04J 3/22; H04J 3/12; H04J 15/00
[52] U.S. Cl. .................. 379/230; 370/84; 370/110.1; 370/118; 379/220; 379/231; 379/234
[58] Field of Search .................. 370/84, 118, 110.1; 379/207, 229, 230, 231, 232, 233, 234, 219, 220

[56] References Cited

U.S. PATENT DOCUMENTS

| | | | |
|---|---|---|---|
| 5,023,869 | 6/1991 | Grover et al. | 370/118 X |
| 5,051,992 | 9/1991 | Taniguchi et al. | 370/110.1 |
| 5,212,691 | 5/1993 | Hokari | 379/230 X |

*Primary Examiner*—Jeffery A. Hofsass
*Assistant Examiner*—Harry S. Hong

[57] ABSTRACT

A telecommunication method and equipment in a network in which at least two exchange units are connected between an originating data terminal and a terminating data terminal. A transfer rate selection unit is provided in each exchange unit, for selecting one rate arbitrarily from a plurality of transfer rates. An originating call is accessed by including a plurality of accessible transfer rates in a call setup message from the originating data terminal, and each transfer rate is determined in the transfer rate selection units in the exchange units in view of a free channel in a trunk line, from received transfer rate information. The call setup information is transferred to the terminating data terminal, and is modified, based on the transfer rate data included in the call connect message from the terminating data terminal in response to the call setup message by the transfer rate selection unit in each exchange unit. The originating data terminal is informed of the data, and communication therewith is ultimately established by using the efficient transfer rate.

8 Claims, 19 Drawing Sheets

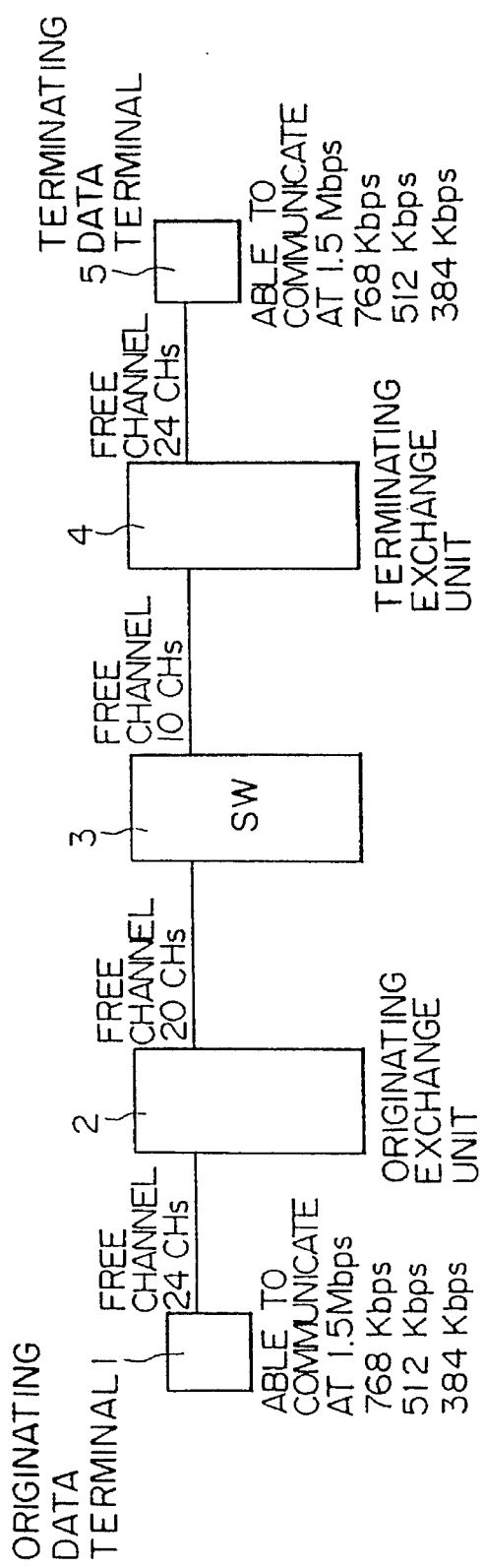

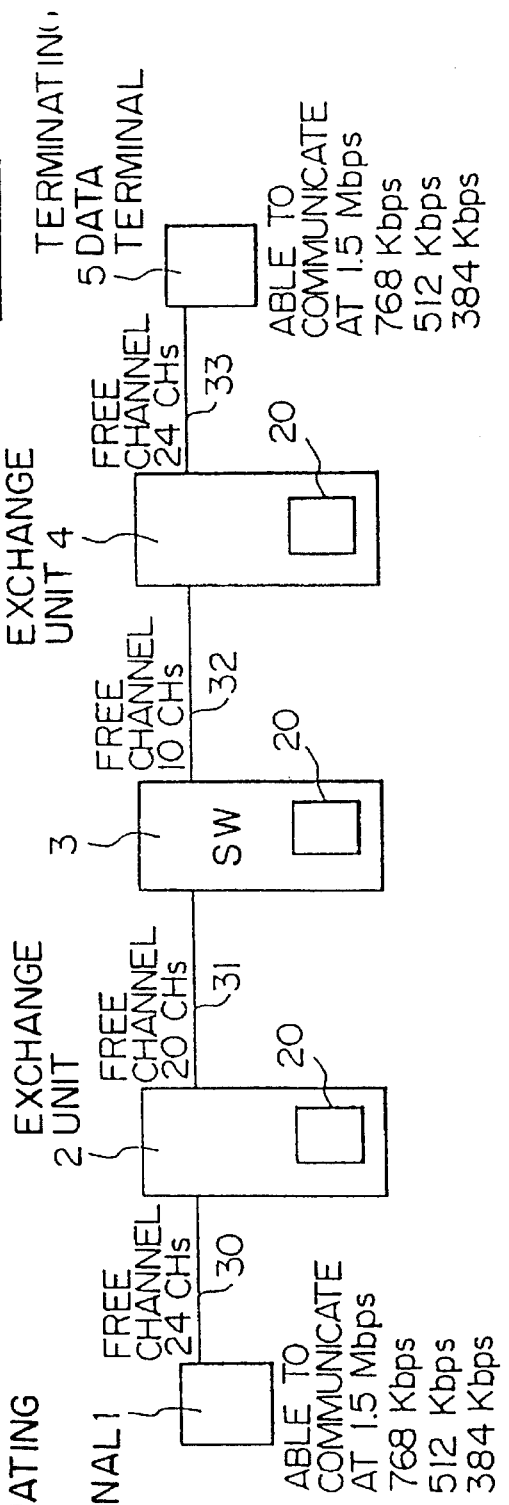

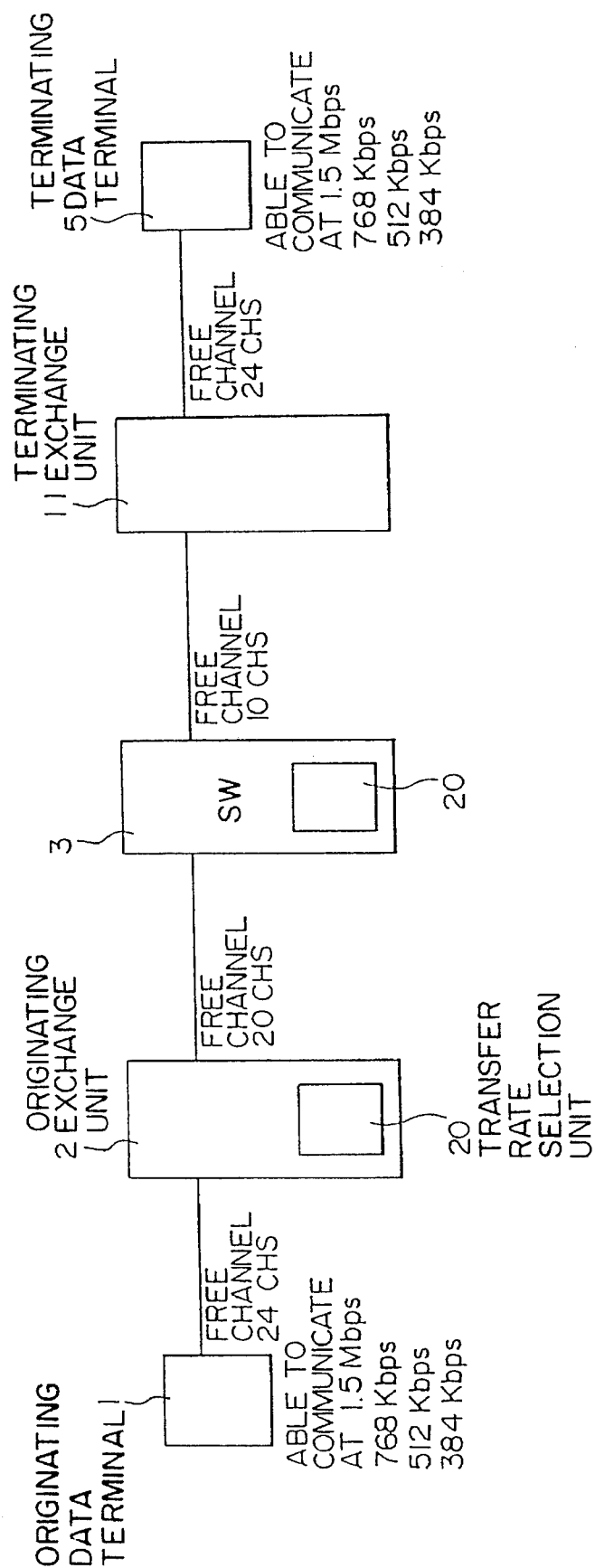

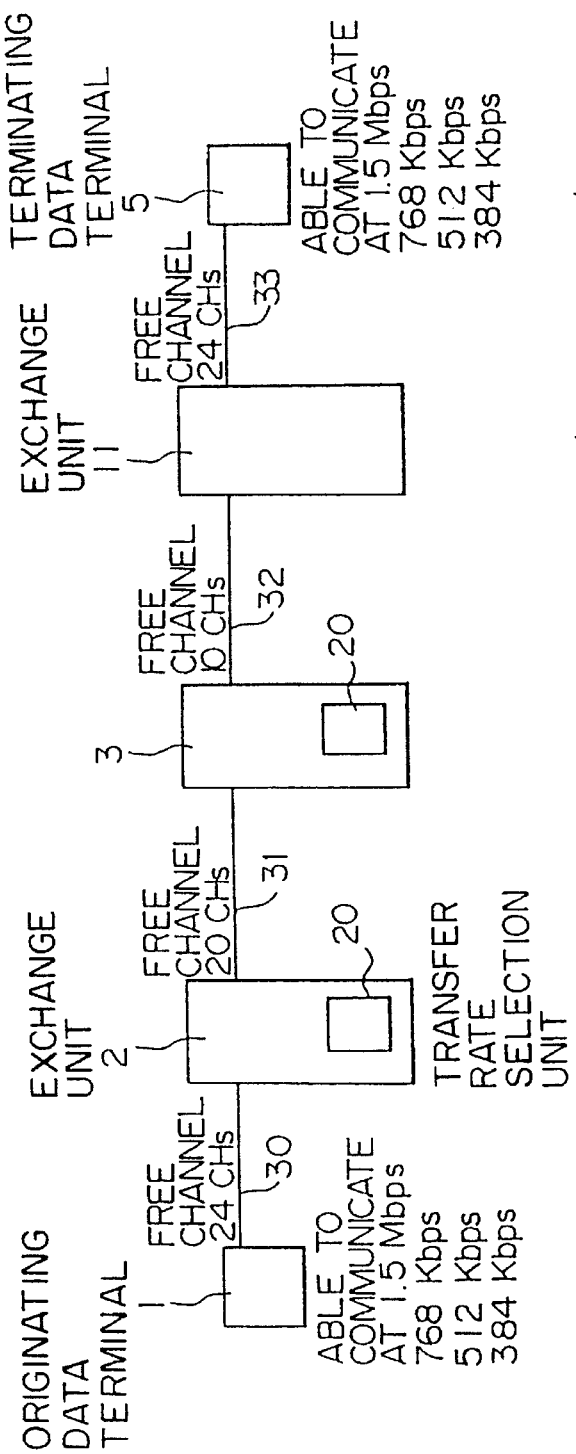

| Fig. 9A | Fig. 9B |

Fig. 9B
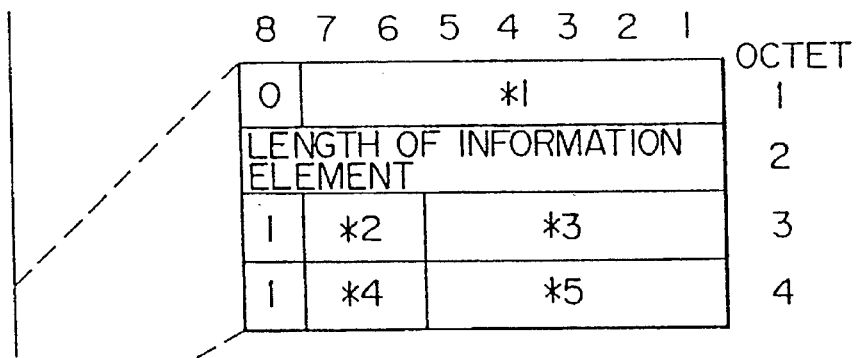
- *1: I.E. IDENTIFIER = BEARER CAPABILITY
- *2: CODING STANDARD = CCITT STANDARD
- *3: INFORMATION TRANSFER CAPABILITY = UNRESTRICTED DIGITAL
- *4: TRANSFER MODE = CIRCUIT MODE
- *5: INFORMATION TRANSFER RATE = 384 kbit/s
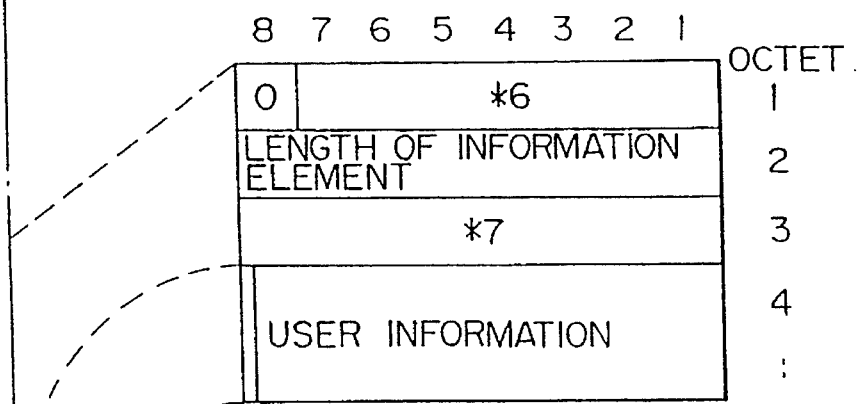
- *6: I.E. IDENTIFIER = USER-USER INFORMATION
- *7: PROTOCOL DISCRIMINATOR = USER SPECIFIC
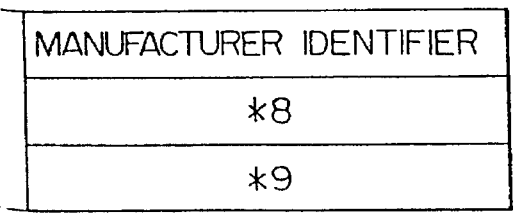
- *8: OPTIONAL TRANSFER RATE = 512 kbit/s
- *9: OPTIONAL TRANSFER RATE = 384 kbit/s

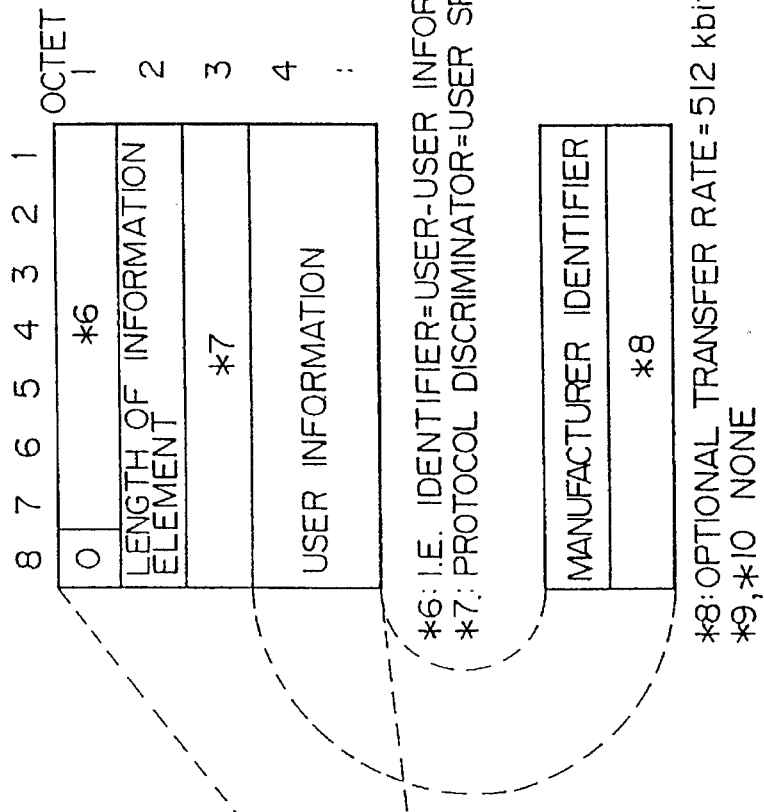
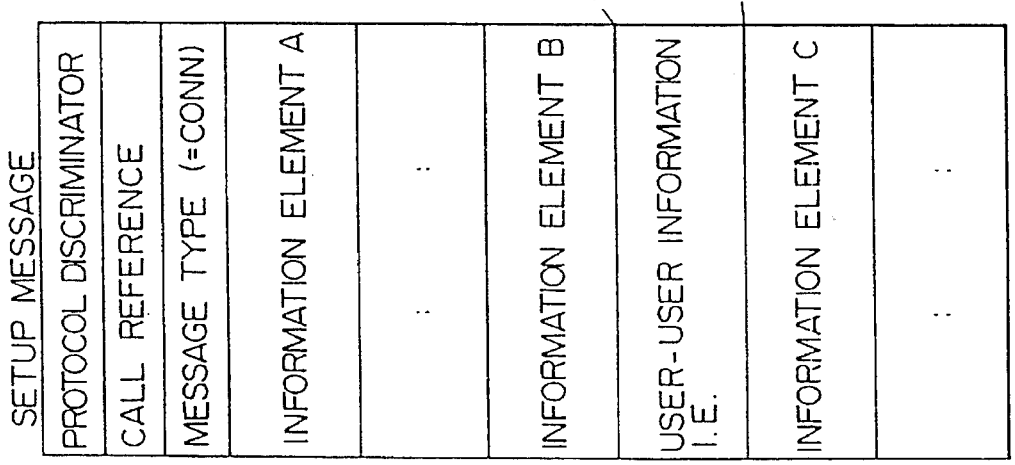
Fig. 10

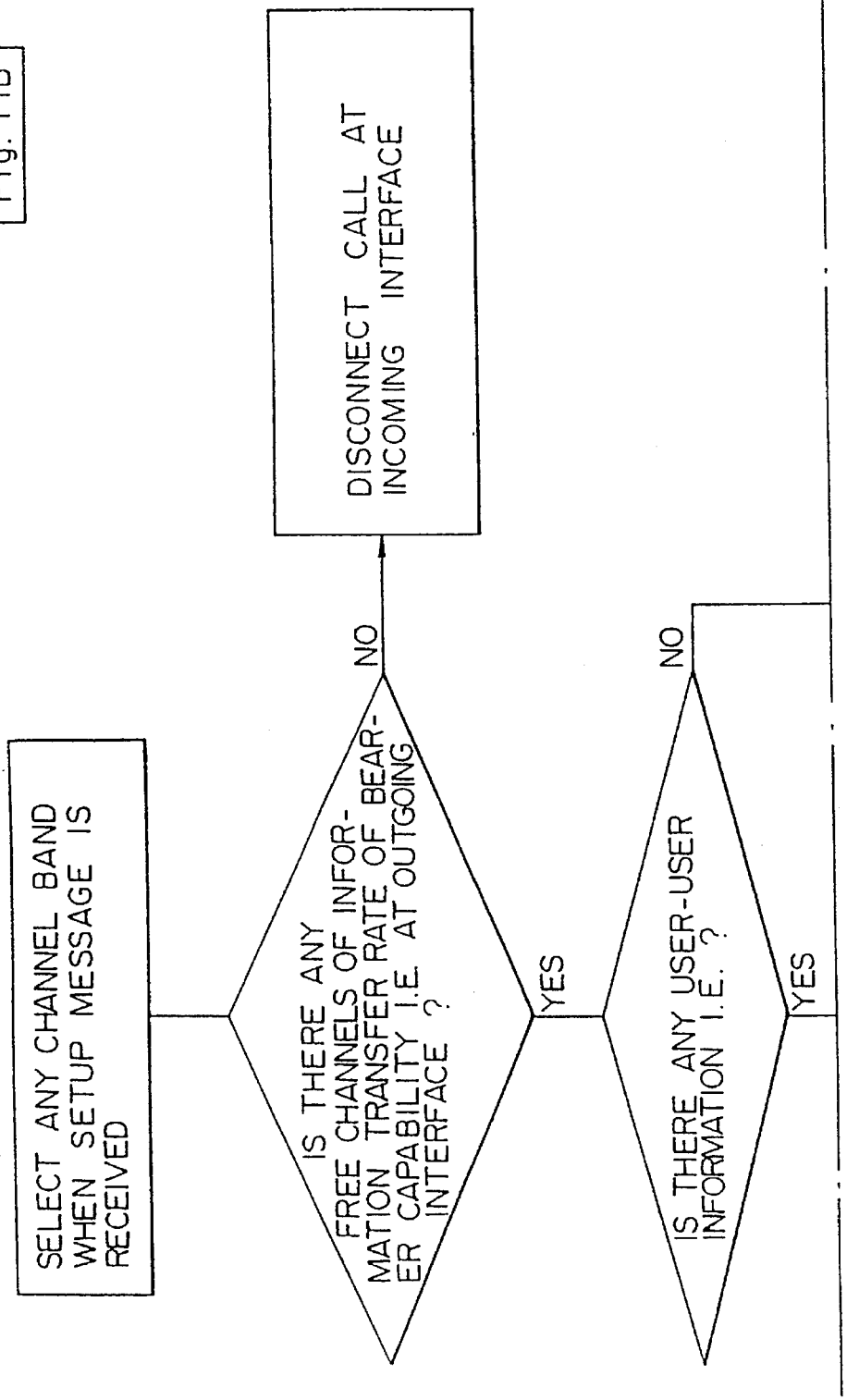

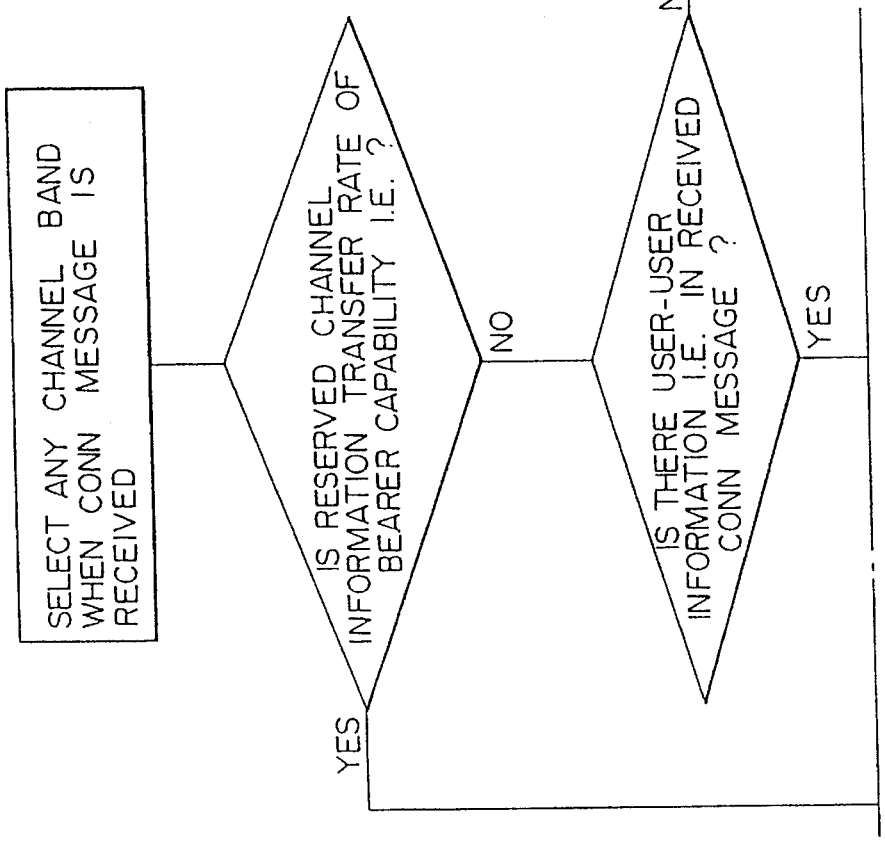

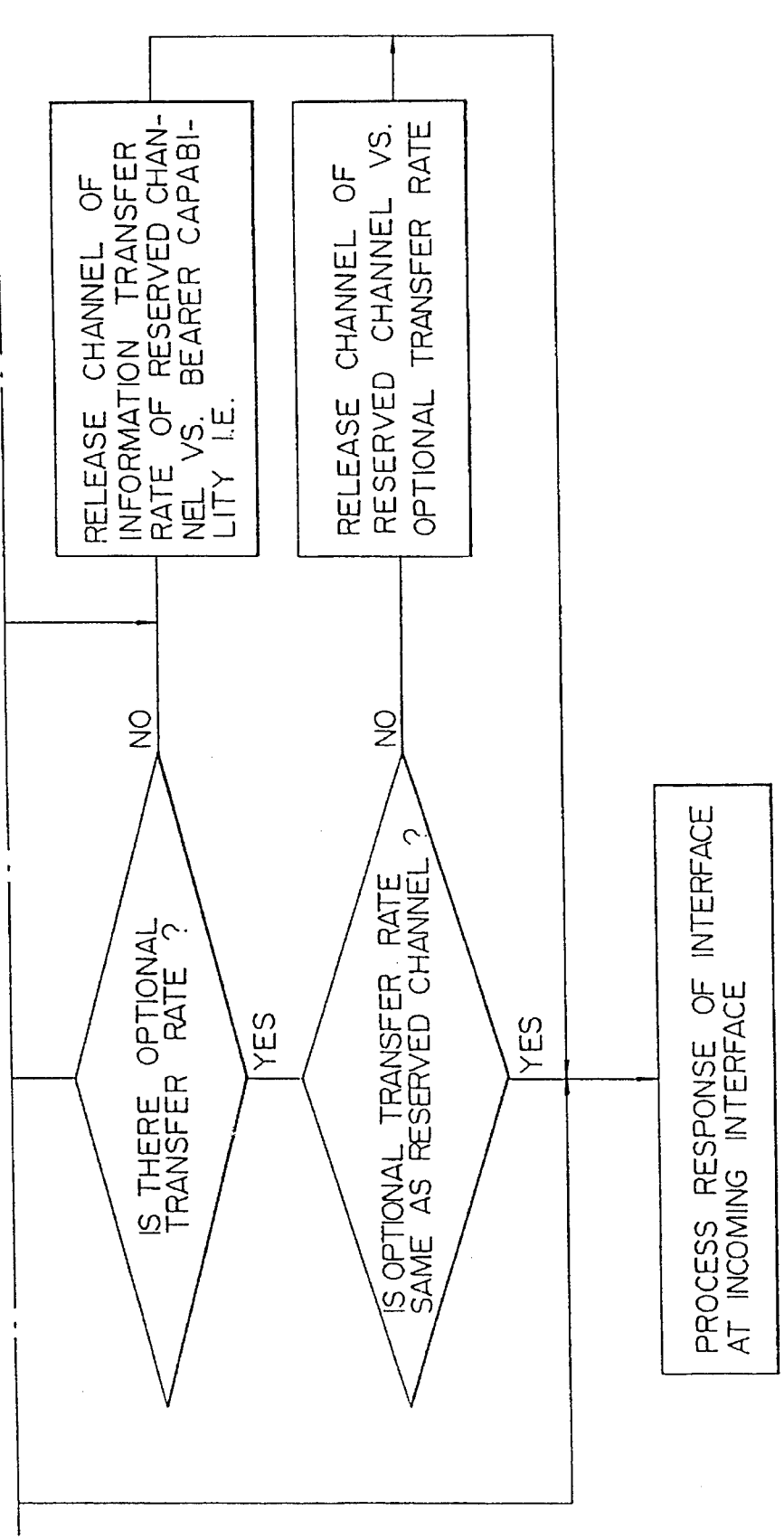

5,469,502

TELECOMMUNICATION SYSTEM FOR SELECTING OPTIMUM TRANSFER RATE

This is a continuation of application Ser. No. 07/883,786, filed May 15, 1992, now abandoned.

BACKGROUND OF THE INVENTION

1. Field of the Invention

The present invention relates to a telecommunication system for selecting an optimum transfer rate, and more particularly to a system in a network using a common channel signaling system for switching information transfer rates.

2. Description of the Related Arts

Since an exchange of call setup information is effected via a common control channel in an interface taking a common channel signalling system, it is possible for a high speed digital trunk line to connect simultaneously a plurality of calls at different transfer rates on an interface. Since traffic amount of a high speed digital trunk line changes with time, communication equipment utilizing thereof communicates at a high speed and a high quality mode in the case of a small amount of traffic, whereas, when the traffic carrying capacity is large, a compact and flexible facility is desired so as to communicate therewith at a reduced communication speed in order to decrease the probability that a call is not completed because of a lack of channels in the trunk line.

In a prior art system, a call setup is attempted from an outgoing communication terminal at the highest transfer rate and if the communication at the highest transfer rate is not possible, the transfer rate is reduced in order and a process is initiated to connect the call again. Therefore, when a call is connected via a plurality of exchange units, there is the problem that it could take a long time before the call is connected. More particularly, when a call is broken up or released on account of a lack of available channels in the trunk line at a time that a SET-UP message arrives up to immediately before a terminating data terminal, it is disadvantageous in that a large amount of time is lost.

In an interface, and in conformity with the ISDN, when the standardized transfer rate is a first order group interface of 1.5 Mbps, it is limited to 64 Kbps, 384 Kbps, and 1.5 Mbps. Therefore, for example, in the case of a communication of 768 Kbps, a channel of 1.5 Mbps must be utilized, thereby reducing the utility efficiency of the trunk line.

The present invention is intended to solve the above problem.

SUMMARY OF THE INVENTION

The present invention has been constructed in consideration of the above problems.

An object of the present invention is to provide a variable band telecommunication system for selecting an optimum transfer rate between an originating data terminal and a terminating data terminal based on a call-out at the originating data terminal.

In accordance with the feature of the present invention, there is provided a telecommunication system in a network such that at least two exchange units are connected between an originating data terminal and a terminating data terminal; said system comprising the steps of providing a transfer rate selection unit for selecting one rate arbitrarily from a plurality of transfer rates within said exchange units, accessing an originating call by including a plurality of accessible transfer rates in a call setup message from said originating data terminal, determining each transfer rate in said transfer rate selection unit in said exchange units in view of a free channel in a trunk line, from received transfer rate information, transferring the call setup information to said terminating data terminal, modifying, based on the transfer rate data included in a call connect message from said terminating data terminal in response to said call setup message by said transfer rate selection unit in each exchange unit, transfer rate data maintained up to that time and informing said originating data terminal of said data; and communicating therewith ultimately by using the most efficient transfer rate.

BRIEF DESCRIPTION OF THE DRAWINGS

FIGS. 2A and 2B are views showing an operational sequence of the prior art telecommunication system.

FIGS. 4A and 4B are diagrams showing an operational sequence of the system shown in FIG. 3;

FIG. 5 is a block diagram showing the constitution of another embodiment of the present invention;

FIGS. 6A and 6B are diagrams showing the operational sequence of the system shown in FIG. 5;

FIGS. 9A and 9B are view showing another example of a SETUP message structure;

FIG. 10 is a view showing an example of a CONN message structure in FIG. 4B;

FIGS. 11A and 11B are flow charts showing a channel band selection processing in the exchange unit when a SETUP message is received; and FIGS. 12A and 12B are flow charts showing a channel band selection processing in the exchange unit when a CONN message is received.

PREFERRED EMBODIMENTS OF THE INVENTION

With reference to prior art drawings, the present invention will be described in detail.

Figure 1:
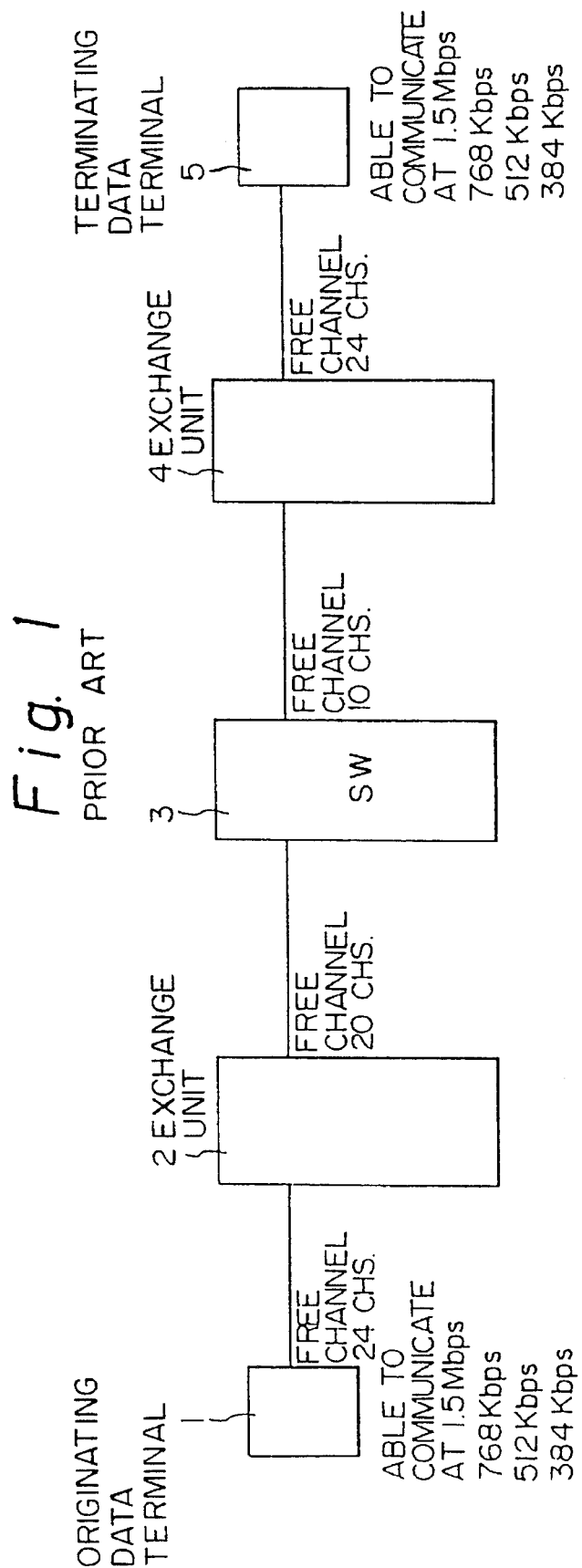
FIG. 1 is a block diagram showing the constitution of a prior art telecommunication system.

FIG. 1 is a block diagram showing the constitution of a prior art telecommunication system.

Reference numerals 1 and 5 are data terminals used for communication and abbreviated by data terminals. An originating data terminal 1 and an originating exchange unit 2, the originating exchange unit 2 and a transit switch unit 3, the transit switch 3 and a terminating exchange unit 4, and the terminating exchange unit 4 and a terminating data terminal 5 are connected therewith, respectively.

In general, according to the ISDN specification, a bandwidth is 1.5 Mbps and for example, in the case of 64 Kbps of B channel, there are 24 available channels.

There are only three kinds of standard transfer rates, viz., 64 Kbps, 384 Kbps and 1.5 Mbps, in the ISDN specification. In this case, suppose that the originating data terminal 1 enables communication, at 768 Kbps and 512 Kbps of the transfer rates, other than the above-described standard transfer rates, viz., 64 Kbps, 384 Kbps and 1.5 Mbps.

On the other hand, suppose that communication at the terminating date terminal 5 side by means of the same transfer rate as at the originating data terminal 1 is enabled. Then, a sequence where a call is occupied from the originating data terminal 1 to the terminating data terminals 5 will be described herein.

Figure 2B:
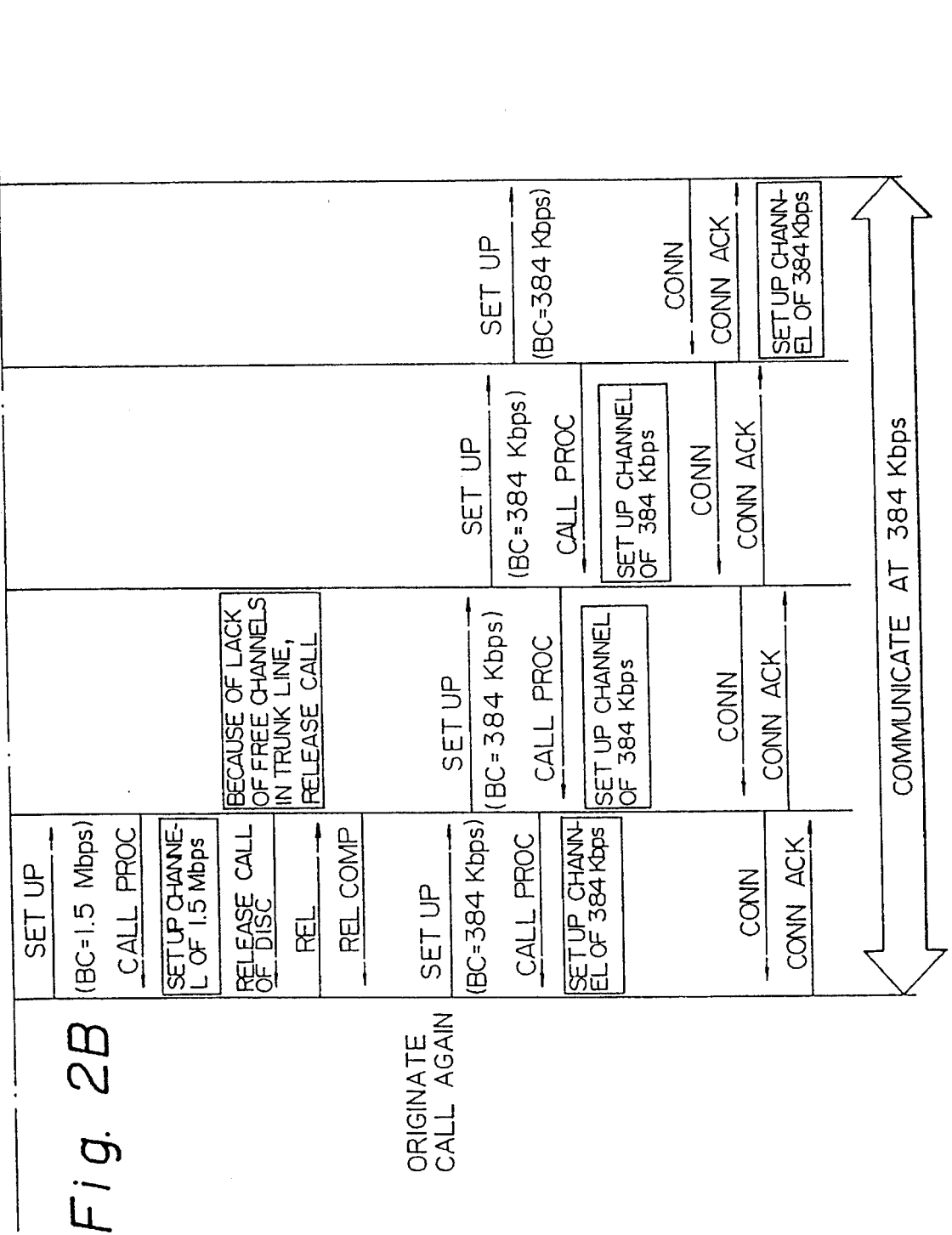

FIGS. 2A and 2B are views showing an operational sequence of the prior art telecommunication system. The sequence diagram illustrates the operation of equipment as shown in the figure in correspondence to the operation of the equipment.

Since there are twenty four free channels between the originating data terminal 1 and the originating exchange unit 2, the originating data terminal 1 intends to be occupied by a call of the maximum transfer rate BC=1.5 Mbps (where BC is referred to as a standardized information element) at a setup time. Correspondingly, in the originating exchange unit 2, an answer signal CALL PROC is returned to the originating data terminal 1 side.

In this case, the originating data terminal 1 intends to set up a channel of 1.5 Mbps, but the originating exchange unit 2 releases a call because of a lack of a free channel in a trunk circuit, and a call release signal DISC is returned to the originating data terminal 1 side. In response to this, the originating data terminal 1 produces a REL signal, and the originating exchange unit 2 produces an answer signal REL COMP to REL to answer the originating data terminal 1.

Next, the originating data terminal 1 calls again by the next BC transfer rate of 384 Kbps to deliver a SETUP message. In order to satisfy the transfer rate of 384 Kbps, six channels of each trunk line will do. Since all trunk lines include a free channel of more than six channels, the SETUP message proceeds from the originating exchange unit 2 to the transit switch unit 3, from the transit switch unit 3 to the terminating exchange unit 4, and from the terminating exchange unit 4 to the terminating data terminal 5 by the standard transfer rate BC, viz., 384 Kbps.

In a procedure of this sequence, the originating exchange unit 2 first returns a CALL PROC signal to the originating data terminal 1, meanwhile a channel of 384 Kbps is set up at the transit switch unit 3. Then, the transit switch unit 3 returns a CALL PROC signal to the originating exchange unit 2, meanwhile a channel of 384 Kbps is set up at the terminating exchange unit 4. Then, the terminating exchange unit 4 returns a CALL PROC signal to the transit switch unit 3, meanwhile a channel of 384 Kbps is set up at the terminating data terminal 5.

In response to an originating call request at the transfer rate of 384 Kbps, the terminating data terminal 5 imparts a connect request message CONN that indicates that communication is possible or obtainable at this transfer rate to the terminating exchange unit 4, which responds with an OK signal, viz., CONN ACK thereto. Thereby, a channel of 384 Kbps is set up between the terminating exchange unit 4 and the terminating data terminal 5.

Next, a CONN message is delivered from the terminating exchange unit 4 to the transit switch unit 3; a CONN ACK signal is returned from the transit switch unit 3 to the terminating exchange unit 4; then a CONN message is delivered from the transit switch unit 3 to the originating exchange unit 2; a CONN ACK signal is returned from the originating exchange unit 2 to the transit switch unit 3; then a CONN message is delivered from the originating exchange unit 2 to the originating data terminal 1, and a CONN ACK signal is returned from the originating data terminal 1 to the original exchange unit 2. By a sequence as described above, a channel of the transfer rate 384 Kbps is occupied between the originating data terminal 1 and the terminating data terminal 5. Thereafter, communication can be effected by the transfer rate of 384 Kbps.

In the prior art telecommunication system as described above, a call setup from the originating data terminal 1 is attempted at the highest transfer rate and if communication at the highest transfer rate is not possible, the transfer rate is reduced in order and a procedure is initiated to convert the call again. Therefore, when a call is connected thereto via a plurality of exchange units, there is the problem that it takes a long time before the call is connected. More particularly, when a call is broken up or released because of a lack of free channels in the trunk line at a time that a SETUP message arrives up to immediately before a terminating data terminal, it is disadvantageous in that a large amount of time is lost.

Further, in an interface, and in conformity with the ISDN, when the standardized transfer rate is a first order group interface of 1.5 Mbps, it is limited to 64 Kbps, 384 Kbps and 1.5 Mbps. As a result, for example, also in the case of communication of 768 Kbps, the utilization efficiency of a trunk line is limited because a channel of 1.5 Mbps must be utilized.

To solve the above problem, the present invention has been devised.

An object of the present invention is to provide a telecommunication system in a network such that at least two exchange units are connected between an originating data terminal and a terminating data terminal; said system comprising the steps of providing a transfer rate selection unit for selecting one rate arbitrarily from a plurality of transfer rates within said exchange units, accessing an originating call by including a plurality of accessible transfer rates in a call setup message from said originating data terminal, determining each transfer rate in said transfer rate selection unit in said exchange units in view of a free channel in a trunk line, from received transfer rate information, transferring the call setup information to said terminating data terminal, and modifying, based on the transfer rate data included in a call connect message from said terminating data terminal in response to said call setup message by said transfer rate selection unit in each exchange unit, transfer rate data maintained up to that time and informing said originating data terminal of said data.

Figure 3:
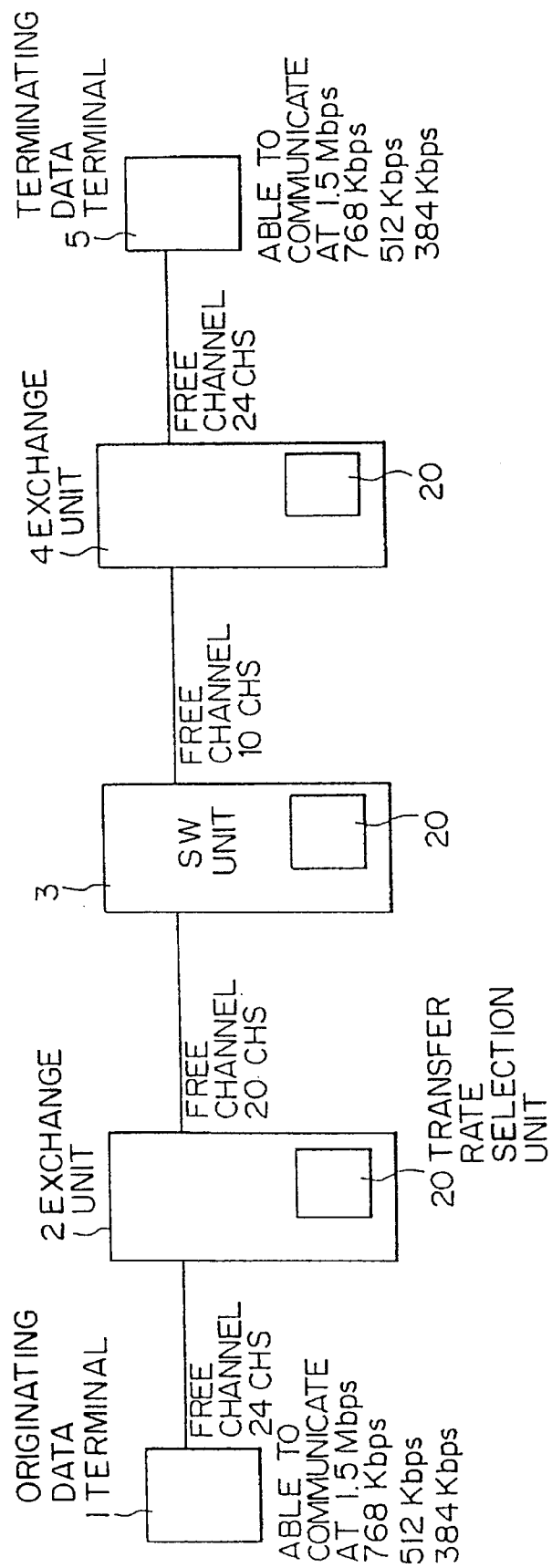
FIG. 3 is a block diagram showing the constitution of a telecommunication system of the present invention.

FIG. 3 is a block diagram showing the constitution of a telecommunication system of the present invention. A telecommunication system shown in FIG. 3 forms a network in which at least two exchange units 2, 3, 4 are connected between an originating data terminal 1 and a terminating data terminal 5.

Reference numeral 20 denotes a transfer rate selection unit that is arranged within each of the above exchange units 2, 3, 4 and can select an arbitrary transfer rate from among a plurality of transfer rates.

A plurality of obtainable (capable of communicating) transfer rates are included in a call setup message and a call originates from the originating data terminal 1. The transfer rate selection unit 20 in the above-noted exchange units determines a transfer rate in view of the free channels in the trunk line from received transfer rate information, and concurrently therewith, call setup information is connected to the terminating data terminal. In a process involving an answer message from the terminating data terminal 5 being imparted to the originating data terminal 1 based on the transfer rate information from the terminating data terminal 5 side, while the transfer rate selection unit 20 in each exchange unit is changing the transfer rate information that has occupied the unit thus far to inform the originating data terminal 1 and communication is possible by the most efficient transfer rate. By using such a method, there is provided a variable band telecommunication system such that the optimum transfer rate between the originating and terminating data terminals can be obtained by a one time call originating at the originating data terminal 1.

The operation of an embodiment of the present invention will be described with reference to the following drawings.

Figure 4B:
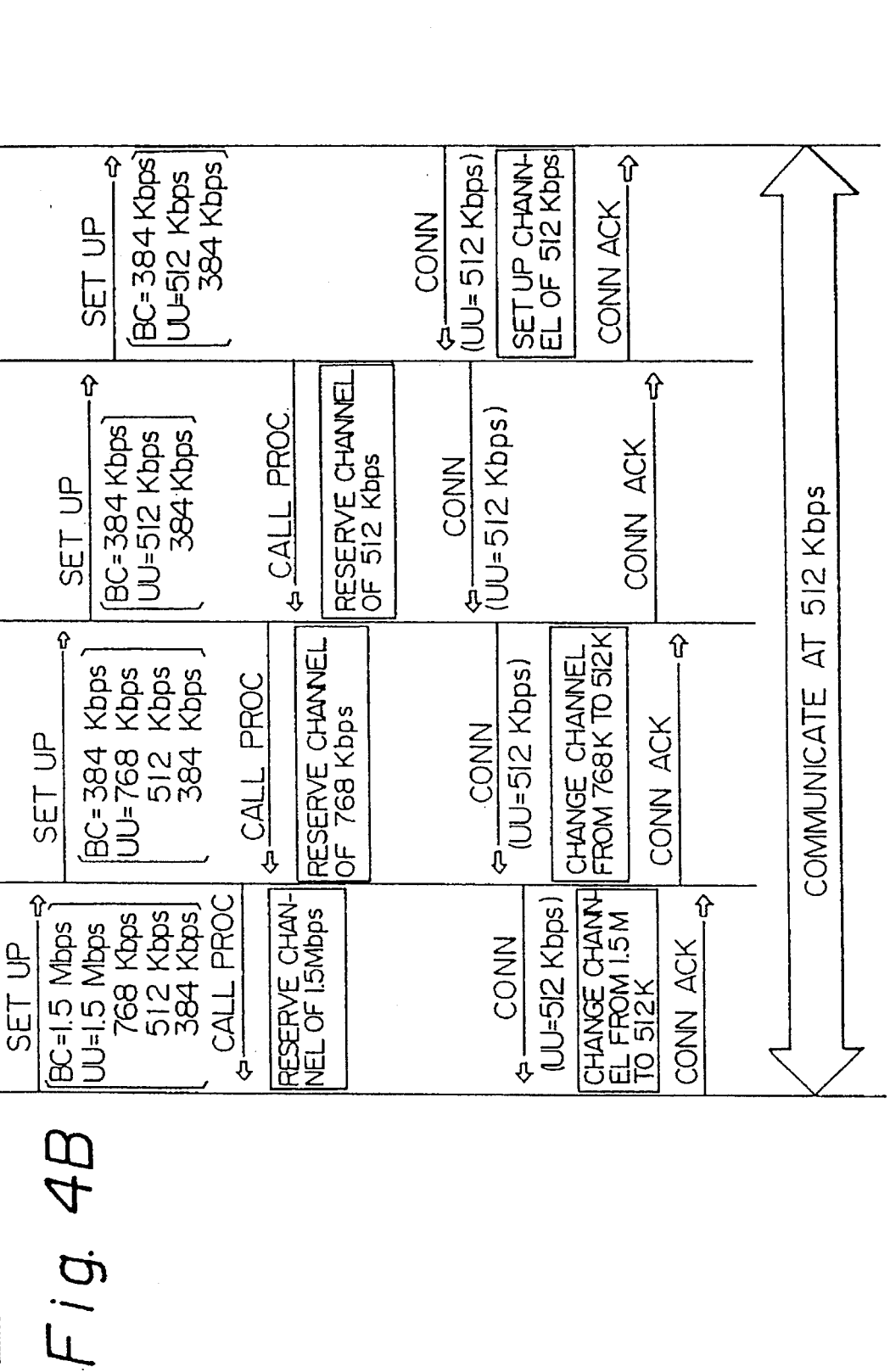

FIGS. 4A and 4B are diagrams showing an operational sequence of the system shown in FIG. 3.

Suppose that a number of free channels of the trunk line 30 between the originating data terminal 1 and the originating exchange unit 2 is twenty four, that of the trunk line 31 between the originating exchange unit 2 and a transit switch unit 3 is twenty, that of the trunk line 32 between the transit switch unit 3 and the terminating exchange unit 4 is ten, and that of the trunk line 33 between the terminating exchange 4 and the terminating data terminal 5 is twenty four.

The originating data terminal 1 is capable of communicating by means of a transfer rate of 1.5 Mbps, 768 Kbps, 512 Kbps, and 384 Kbps. This is the same with the terminating data terminal 5, and there is provided a transfer rate selection unit 20 in each of the exchange units 2, 3, 4 by which the present invention is characterized.

In the system constituted as such, when the originating data terminal 1 originates a call, a transfer rate of 1.5 Mbps is added to a standardized information element BC to deliver a call setup message SETUP such that all the obtainable transfer rates, viz., 1.5 Mbps, 768 Kbps, 512 Kbps and 384 Kbps, are added to an information element UU that users can freely utilize (a standardized information element is abbreviated by UU hereinafter). The originating exchange unit 2 receiving the message SETUP returns a CALL PROC signal to the originating data terminal 1, to reserve a channel of 1.5 Mbps between the originating data terminal 1 and the originating exchange unit 2.

Since the number of free channels of the trunk line 31 is 20 channels and communication of 1.5 Mbps is not possible, a transfer rate selection unit 20 within the originating exchange unit 2 eliminates 1.5 Mbps from the obtainable transfer rates to deliver a call to a transit switch unit 3. In this case, regarding the transfer rate contained in the SETUP information, when the trunk line 31 is 20 channels, the BC obtainable is 384 Kbps under 1.5 Mbps and the UU is 768 Kbps, 512 Kbps, and 384 Kbps, but not 1.5 Mbps. The transit switch unit 3 returns a CALL PROC signal to the originating exchange unit 2 to reserve a channel of 768 Kbps.

Since a free channel of the trunk line 32 is ten channels and communication at 768 Kbps is not possible, the transfer rate selection unit 20 within the transit switch unit 3 delivers a call setup message, not including 768 Kbps, to the terminating exchange unit 4. Therefore, the transfer rate included in the SETUP message is 384 Kbps of the BC and 512 Kbps and 384 Kbps of the UU. On the other hand, the terminating exchange unit 4 returns a CALL PROC signal to the transit switch unit 3 to reserve a channel of 512 Kbps.

Then, since a free channel of the trunk line is twenty four channels, the transfer rate selection unit 20 within the terminating exchange unit 4 delivers the received transfer rate information (The BC is 384 Kbps and the UU are 512 Kbps and 384 Kbps) intact to the terminating data terminal 5.

The terminating data terminal 5 selects 512 Kbps of the maximum transfer rate that is possible to communicate therewith, among the transfer rates included in the information element UU that users of a call setup message can freely utilize and 512 Kbps is entered into the answer message CONN returned to the originating side. Thereby, it is concluded that a channel of 512 Kbps is set up between the terminating data terminal 5 and the terminating exchange unit 4. The terminating exchange unit 4 returns a CONN ACK signal to the terminating data terminal 5.

The information element UU of 512 Kbps is imparted from the terminating exchange unit 4 to the transit switch unit 3 by the CONN message. Since communication of 512 Kbps is OK meanwhile, the transit switch unit 3 returns a CONN ACK signal to the terminating exchange unit 4. Then, the transit switch unit 3 imparts a CONN message of UU=512 Kbps to the originating exchange unit 2. The transfer rate selection unit 20 within the originating exchange unit 2 switches the 768 Kbps that is reserved at the time of a prior SETUP to the 512 Kbps. Therefore, a CONN ACK signal is returned from the originating exchange, unit 2 to the transit switch unit 3.

The originating exchange unit 2 imparts a message of the UU=512 Kbps to the originating data terminal 1. When the originating data terminal 1 receives the message, it switches from a channel of 1.5 Mbps, which has been reserved in advance, to a channel of 512 Kbps. Then a CONN ACK signal is returned from the originating data terminal 1 to the originating exchange unit 2. Thus, a channel that becomes free because of switching of a channel is released for the other calls.

Thus, the originating data terminal 1 and the terminating data terminal 5 can communicate therewith at the transfer rate of 512 Kbps, which is not standardized by the ISDN system and there remains no unusable channel on the trunk line. Therefore, the utility efficiency of the channels is improved.

FIG. 5 is a block diagram showing the constitution of another embodiment of the present invention.

In the embodiment of FIG. 5, it is shown that a terminating exchange unit 11 does not include the transfer rate selection unit 20. In such a system, since the terminating exchange unit 11 cannot satisfy the function of the present invention, the content of the information unit UU that users can freely utilize is not delivered to the terminating date terminal 5. For this reason, the information element that users can freely utilize cannot be included in the answer message that returns to the originating side. Other factors; viz., the number of free channels of each trunk line and the transfer rates of the originating data terminal 1 and the terminating data terminal 5 are set up in the same way as in FIG. 3.

Figure 6B:
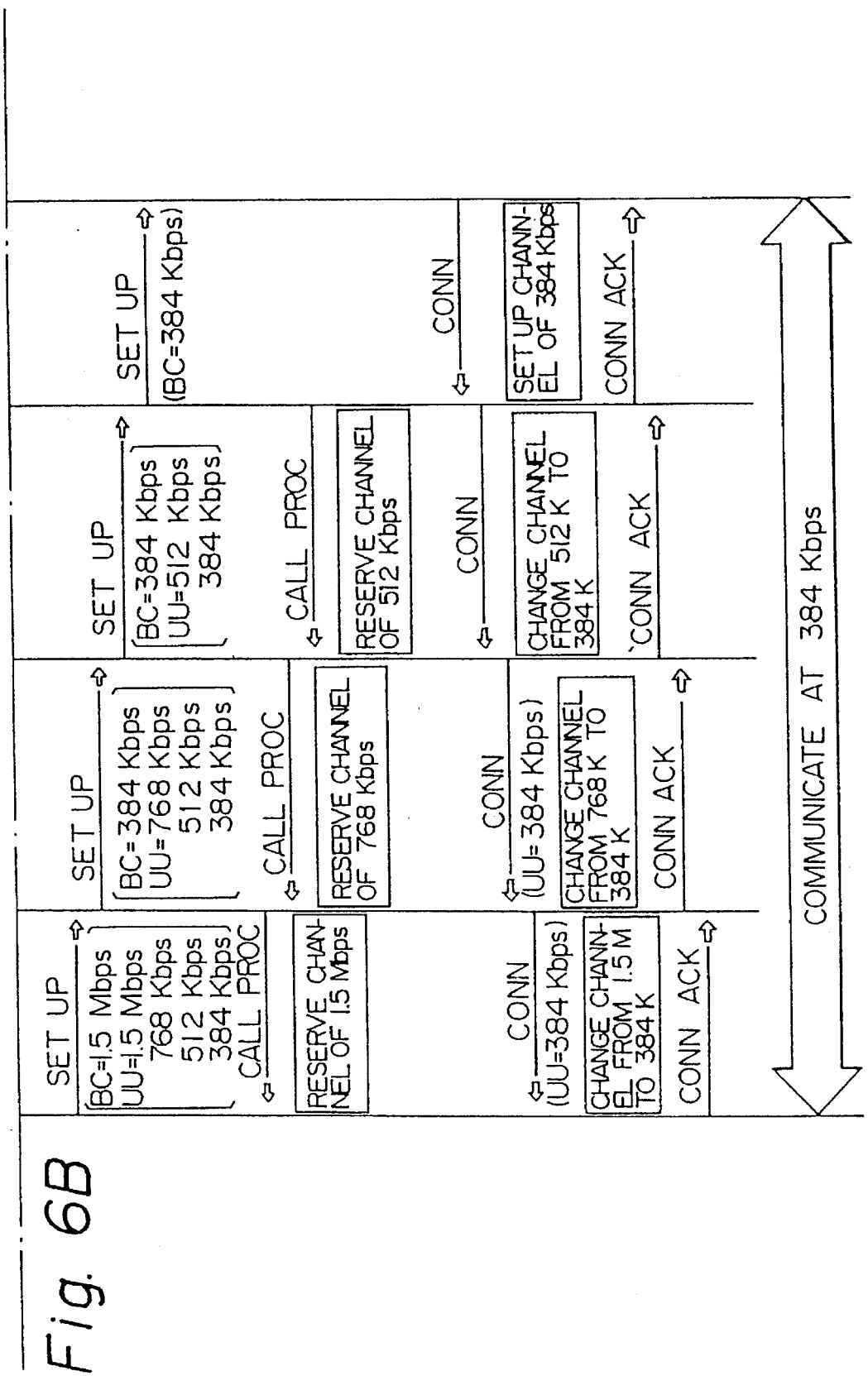

FIG. 6 is a diagram showing the operational sequence of the system shown in FIG. 5. The process, until the transit switch unit 3, includes imparting the SETUP message to the terminating exchange unit 11 and is the same as shown in FIG. 4. Since there is not a transfer rate selection unit 20 in the terminating exchange unit 11, the terminating exchange unit 11 can only deliver a transfer rate of the BC level. Therefore, the terminating exchange unit 11 can only inform the terminating data terminal 5 that the BC=384 Kbps as SETUP information.

The terminating data terminal 5 determines to send a signal based on the received 384 Kbps and imparts a connect command CONN to the terminating exchange unit 11. The terminating exchange unit 11 returns a CONN ACK signal to the terminating data terminal 5. As a result, a channel of 384 Kbps is set up between the terminating exchange unit 11 and the terminating data terminal 5.

The terminating exchange unit 11 imparts a connect message CONN of 384 Kbps to the transit switch unit 3 and the transfer rate selection unit 20 changes the setup from a channel of 512 Kbps, which is occupied in advance, to a channel of 384 Kbps, to return a CONN ACK signal to the terminating exchange unit 11.

Then, the transit switch unit 3 imparts a connect message CONN of 384 Kbps to the originating exchange unit 2. The transfer rate selection unit 20 within the originating exchange unit 2 changes the setup from a channel of 768 Kbps, which is occupied in advance, to a channel of 384 Kbps, to return a CONN ACK signal to the transit switch unit 3.

The originating exchange unit 2 imparts a connect message CONN of 384 Kbps to the originating data terminal 1. The originating data terminal 1 changes the setup of a channel of 1.5 Mbps, which has been occupied in advance thus far, to that of a channel of 384 Kbps. The originating data terminal 1 returns a CONN ACK signal to the originating exchange unit 2. Thus, the setup channels are changed by each trunk line and the left channels are released for other calls.

Even if an exchange unit that does not comprise the function of the present invention is interposed between the originating data terminal 1 and the terminating data terminal 5, communication is possible by using a standardized transfer rate.

The originating data terminal (1) and the terminating data terminal (5) are ultimately communicated at the transfer rate of 384 Kbps therebetween.

Figure 7:
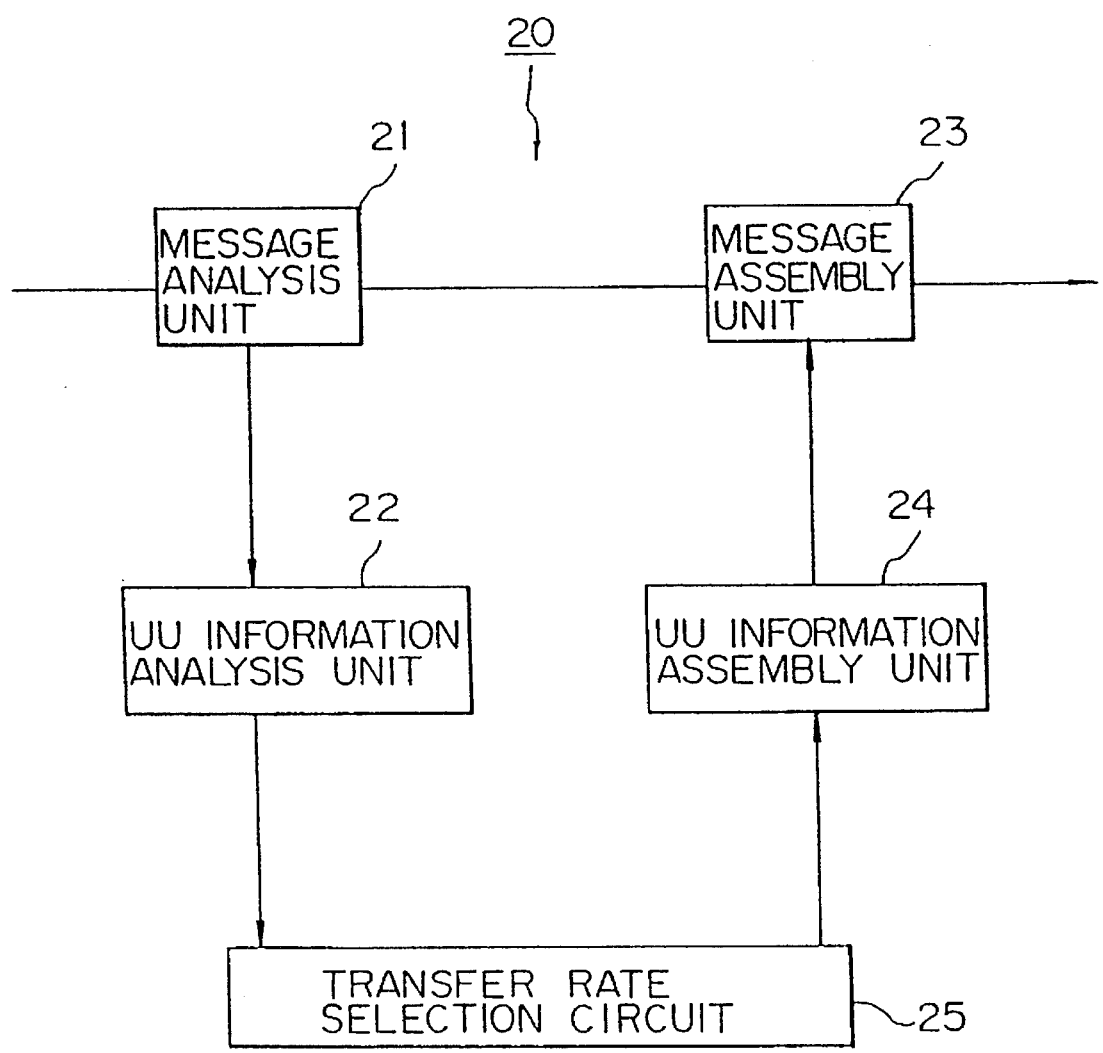
FIG. 7 is a block diagram showing a detailed constitution of the transfer rate selection unit 20 in FIGS. 3 to 6.

FIG. 7 is a block diagram showing a concrete constitution of the transfer rate selection unit 20 in FIGS. 3 to 6.

As shown in FIG. 7, the transfer rate selection unit 20 is formed by a message analysis unit 21 for analyzing a message, a UU information analysis unit 22 for analyzing a UU information, a message assembly unit 23 for assembling a message, a UU information assembly unit 24 for assembling a UU information and a transfer rate selection circuit 25.

The message analysis unit 21 receives a SETUP message to analyze thereof and if the UU information is included therein, the said information is delivered to the UU information analysis unit 22, which further delivers the analyzed UU information to the transfer rate selection unit 25. The transfer rate selection circuit 25 searches a free channel information of the following trunk line and discriminates to which extent of transfer rate of the UU information can be utilized.

Thereafter, the determined UU information is given to the UU information assembly unit 24, which further delivers the assembled UU information to the message assembly unit 23. The message assembly unit 23 inserts the UU information into a predetermined message to assemble a new SETUP message and delivers it to the following exchange unit.

From the above description, the function and operation of three kinds of the originating and terminating exchange units and the transit switch unit are described as for the exchange unit, but the present invention is not limited to it. So long as it is a telecommunication system using at least more than two exchange units, the substantive feature can be also applied thereto.

Regarding a SETUP and CONN message, examples of the structure thereof are illustrated in the following FIGS. 8A, 8B, 9A, 9B, and 10.

Further, a channel band selection processing after the reception of a SETUP and CONN messages will be described in the flow charts of FIGS. 11A, 11B, 12A and 12B.

Figure 8A:
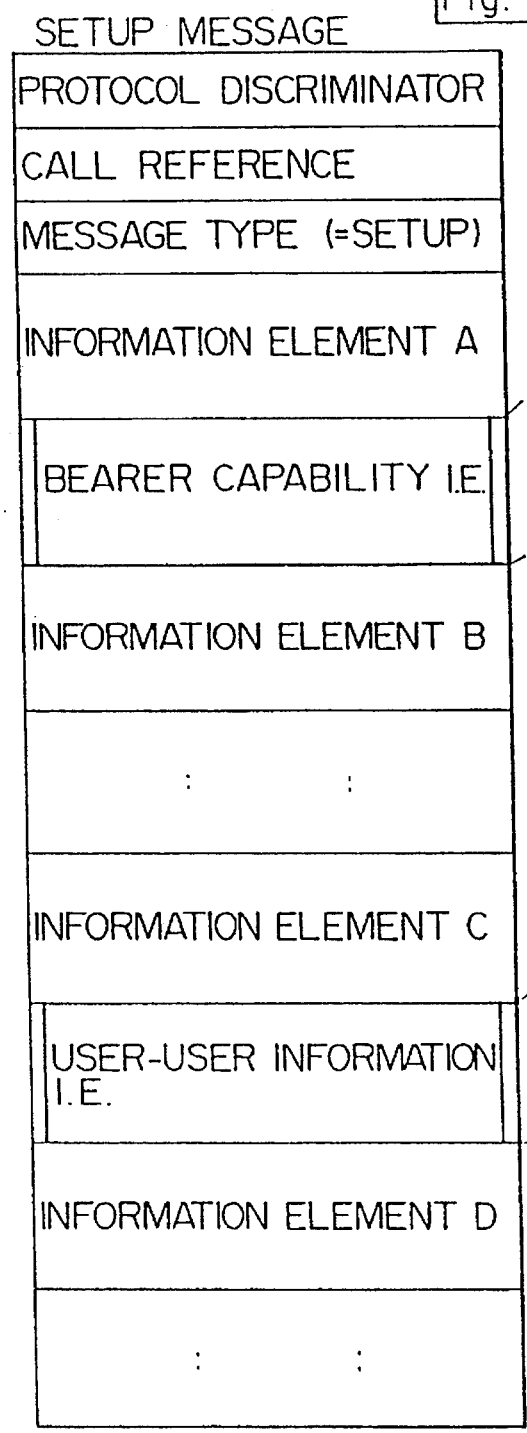
FIGS. 8A and 8B are views showing an example of a SETUP message structure.
Figure 8B:
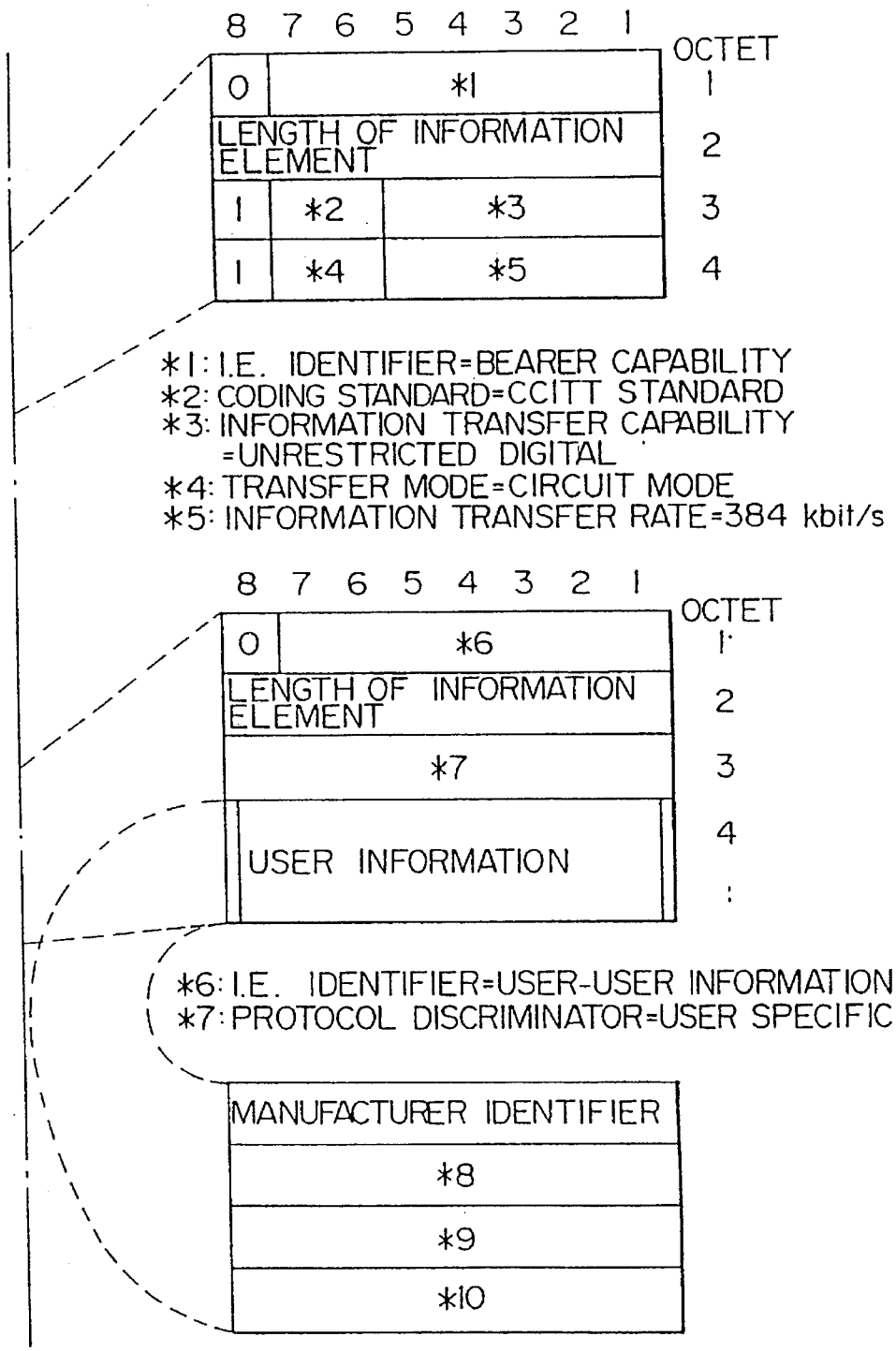
Figures 9, 9A:
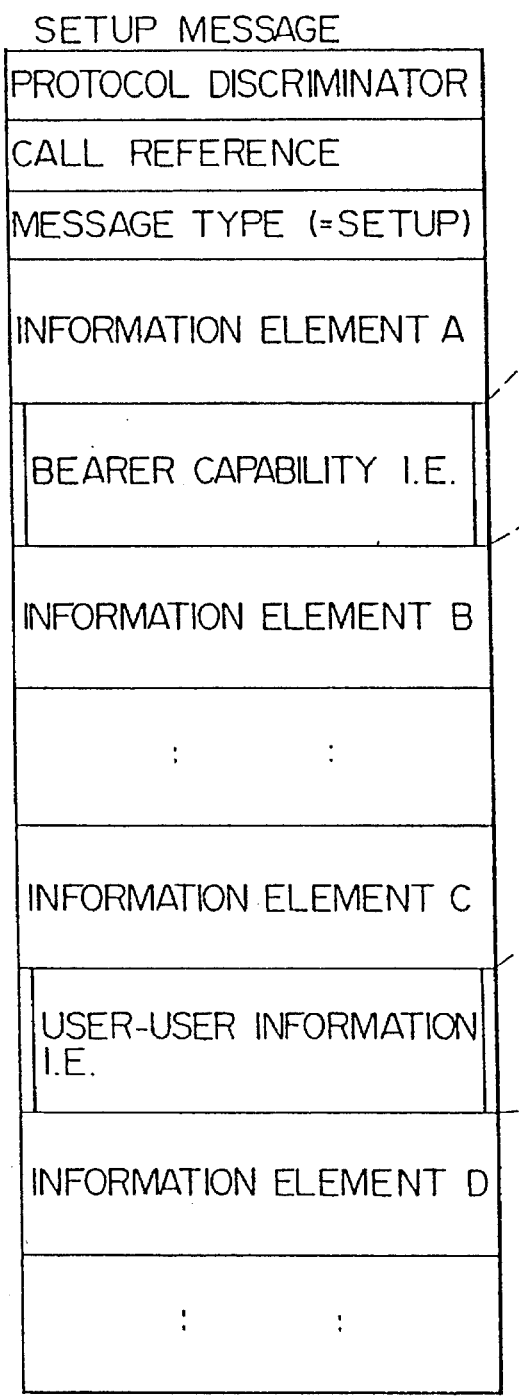
Figure 11B:
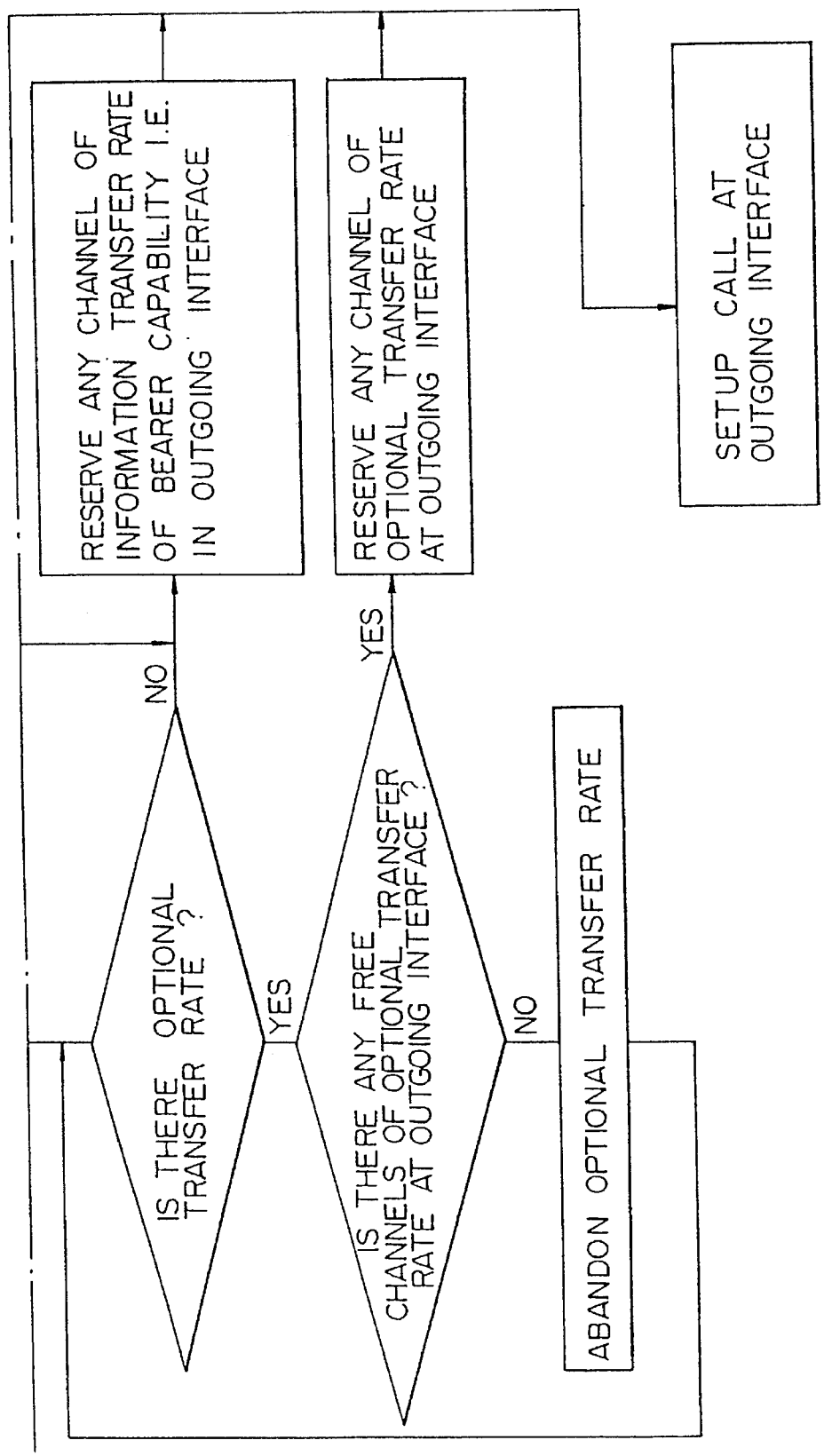

FIGS. 8A and 8B are views showing an example of SETUP message structure;

FIGS. 9A and 9B are views showing another example of SETUP message structure;

FIG. 10 is a view showing an example of a CONN message structure in FIG. 4B;

FIGS. 11A and 11B are flow charts showing a channel band selection processing in the exchange unit when a SETUP message is received; and FIGS. 12A and 12B are flow charts showing a channel band selection processing in the exchange unit when a CONN message is received.

I claim:

1. A telecommunication method in a network in which at least two exchange units are to be connected between an originating data terminal and a terminating data terminal which communicate over an interexchange unit circuit switched connection established by sending a call setup message from an originating exchange unit to a terminating exchange unit, and sending a call connect message from said terminating exchange unit to said originating exchange unit in response to said call setup message in a signalling channel; the method comprising the steps of:

providing a transfer rate selection unit within each of said exchange units, determining a plurality of available transfer rates within free channels in a trunk line to said terminating exchange unit, by the transfer rate selection unit within said originating exchange unit, sending information about said plurality of available transfer rates included in said call setup message from said originating exchange unit, to said terminating exchange unit, selecting a transfer rate information actually to be used in said circuit switched connection between said originating exchange unit and said terminating exchange unit from said information about a plurality of available transfer rates, by the transfer rate selection unit within said terminating exchange unit, sending a selected transfer rate information, included in said call connect message from said terminating exchange unit to said originating exchange unit, changing said available transfer rate provisionally determined by said transfer rate selection means within said originating exchange unit, to said selected transfer rate included in said call connect message, establishing said circuit switched connection, in accordance with said selected transfer rate between said exchange units to provide communication therebetween.

2. A telecommunication method according to claim 1, wherein a transit exchange unit is provided, which transit exchange unit is connected between said originating exchange unit and said terminating exchange unit; said method further comprising the steps of:

providing a transfer rate selection unit within said transit exchange unit, receiving said information about a plurality of available transfer rates by said transfer rate selection unit within said transit exchange unit, said information being included in said call setup message from said originating exchange unit to said transit exchange unit, checking in said transit exchange unit whether or not each of said plurality of available transfer rates is available to transfer, within free channels in a trunk line to said terminating exchange unit, sending modified information about a plurality of available transfer rates, included in said call setup message from said transit exchange unit to said terminating exchange unit, receiving said selected transfer rate information by said transfer rate selection unit within said transit exchange unit, included in said call connect message from said terminating exchange unit to said transit exchange unit, establishing said circuit switched connection in accordance with said selected transfer rate information, between said transit exchange unit and said terminating exchange unit to provide communication therebetween, sending said a selected transfer rate information, included in said call connect message from said transit exchange unit to said originating exchange unit, and establishing said circuit switched connection, in accordance with said selected transfer rate information, between said originating exchange unit and said transit exchange unit.

3. A telecommunication method according to claim 1, wherein said originating exchange unit and said terminating exchange unit are connected by a trunk line in accordance with the integrated services digital network (ISDN) specification; said method further comprising the steps of:

sending said information about a plurality of available transfer rates within an extended information element which users can determine freely in addition to standardized transfer rate information within a standardized information element, from said originating exchange unit to said terminating exchange unit, said information elements being included in a standardized call setup message, selecting a transfer rate information actually to be used from said information about a plurality of available transfer rates if said information about said plurality of available transfer rates is received within said extended information element, or, considering said standardized transfer rate information as said selected transfer rate information if said extended information element is not received or is invalid, by said transfer rate selection unit within said terminating exchange unit, sending said selected transfer rate information within said extended information element included in a standardized call connect message from said terminating exchange unit to said originating exchange unit, and establishing an integrated services digital network (ISDN) circuit switched connection between said exchange units in accordance with said selected transfer rate information if it is included in said standardized call connect message, or, in accordance with said standardized transfer rate information included in said standardized call setup message if said extended information element is absent or is invalid in said standardized call connect message, to provide communication between said exchange units.

4. A telecommunication method according to claim 3, wherein a transit exchange unit is provided and said originating, transit and terminating exchange units are connected to each other by a trunk line in accordance with the integrated services digital network (ISDN) specification; said method further comprising the steps of:

receiving said information about a plurality of available transfer rates if said information is included within said extended information element, in addition to said standardized transfer rate information within said standardized information element, included in said standardized call setup message from said originating exchange unit to said transit exchange unit, checking whether or not information about each of said plurality of selected rates is available to transfer, taking into consideration free channels of an integrated services digital network (ISDN) trunk line to said terminating exchange unit and discarding information on unavailable transfer rates, and checking whether or not said standardized transfer rate information is available to transfer, and sending a standardized call clearing message to said originating exchange unit if it is unavailable, sending modified information about a plurality of available transfer rates within said extended information element in addition to said standardized transfer rate information within said standardized information element, included in said standardized call setup message from said originating exchange unit to said terminating exchange unit, receiving said selected transfer rate information if said information is included within said extended information element included in said standardized call connect message from said terminating exchange unit to said transit exchange unit, sending said selected transfer rate information within said extended information element if it is received from said terminating exchange unit, or, sending no extended information element, included in said standardized call connect message from said transit exchange unit to said originating exchange unit, and establishing said ISDN circuit switched connection between said originating exchange unit and said transit exchange unit and between said transit exchange unit and said terminating exchange unit in accordance with said selected transfer rate information if it is included in said standardized call connect message, or in accordance with said standardized call setup message if said extended information element is absent or is invalid in said standardized call connect message, to provide communication between said exchange units.

5. In an exchange equipment in a network in which at least two exchange units are connected between an originating data terminal and a terminating call data terminal, and wherein a call connect message from the terminating call data terminal answers a call setup message from the originating data terminal, to establish communication between said originating data terminal and said terminating call data terminal, an improvement therein comprising:

a first exchange unit including a first transfer rate selection means for receiving said call setup message including a plurality of available transfer rates, for provisionally determining said transfer rates which are decided by a free channel in an output circuit for the terminating call data terminal and for sending said transfer rates to said terminating call data terminal; and a second exchange unit including a second transfer rate selection means for receiving a call connect message from said terminating call data terminal including a transfer rate finally decided by said terminating call data terminal for changing the transfer rate to said finally decided transfer rate, and for mending said changed transfer rate to said originating data terminal, and means for establishing communication, in accordance with said changed transfer rate between said originating data terminal and said terminating call data terminal.

6. An exchange equipment according to claim 5, wherein said first transfer rate selection means includes:

means for receiving a call setup message from said originating data terminal including a transfer rate in accordance with the integrated services digital network (ISDN) specification and a plurality of available transfer rates which users can determine freely, for provisionally determining said transfer rates which are determined by a free channel in an output circuit for the terminating call data terminal, means for sending said transfer rates to said terminating call data terminal, and wherein said second transfer rate selection means includes:

means for receiving a call connect message from said terminating call data terminal including a transfer rate in accordance with the integrated services digital network (ISDN) specification and a transfer rate finally decided by said terminating call data terminal which users can determine freely, means for changing the transfer rate with said finally determined transfer rate selection means based on said usable transfer rate, means for sending said changed transfer rate to said originating data terminal.

7. An exchange equipment according to claim 6, wherein said first transfer selection means are configured such that when any of a plurality of transfer rates in the received call setup message is not available in the output circuit for the terminating call data terminal, transfer rates other than the available transfer rate from a plurality of transfer rates within a call setup message are deleted and said call setup message is transmitted to said terminating call data terminal.

8. An exchange equipment according to claim 5, wherein said first transfer selection means are configured such that when any of a plurality of transfer rates in the received call setup message is not available in the output circuit for the terminating call data terminal, transfer rates other than the available transfer rate from a plurality of transfer rates within a call setup message are deleted and said call setup message is transmitted to said terminating call data terminal.

* * * * *